United States Patent
Kliemannel et al.

(10) Patent No.: US 7,603,926 B2
(45) Date of Patent: Oct. 20, 2009

(54) SHIFT-BY-WIRE SHIFTING WITH P POSITION

(75) Inventors: Wolfgang Kliemannel, Lemförde (DE); Jörg Meyer, Wagenfeld (DE)

(73) Assignee: ZF Lemforder Metallwaren AG, Stemwede-Dielingen (DE)

( * ) Notice: Subject to any disclaimer, the term of this patent is extended or adjusted under 35 U.S.C. 154(b) by 739 days.

(21) Appl. No.: 11/156,840

(22) Filed: Jun. 20, 2005

(65) Prior Publication Data
US 2005/0235769 A1 Oct. 27, 2005

(30) Foreign Application Priority Data
Apr. 4, 2003 (DE) ................. 103 15 643

(51) Int. Cl.
*B60K 20/00* (2006.01)
*G05G 5/00* (2006.01)

(52) U.S. Cl. ............... 74/473.21; 74/473.22; 74/473.23

(58) Field of Classification Search ............... 74/473.12, 74/473.21, 473.22, 473.24, 473.25, 473.26
See application file for complete search history.

(56) References Cited

U.S. PATENT DOCUMENTS

| | | | | |
|---|---|---|---|---|
| 1,241,414 A | * | 9/1917 | Masury et al. | 74/473.22 |
| 1,727,646 A | * | 9/1929 | Hunt et al. | 74/473.22 |
| 3,410,150 A | * | 11/1968 | Wieland et al. | 74/473.22 |
| 3,559,501 A | * | 2/1971 | Wieland | 74/473.22 |
| 3,597,992 A | * | 8/1971 | Lowry et al. | 74/416 |
| 4,519,266 A | * | 5/1985 | Reinecke | 74/471 XY |
| 6,082,214 A | * | 7/2000 | Paparoni | 74/473.22 |
| 2001/0004850 A1 | * | 6/2001 | Kim | 74/473.12 |
| 2004/0035237 A1 | * | 2/2004 | Matsui et al. | 74/473.12 |
| 2004/0237692 A1 | * | 12/2004 | Syamoto et al. | 74/473.12 |
| 2005/0028632 A1 | * | 2/2005 | Giefer et al. | 74/473.1 |

FOREIGN PATENT DOCUMENTS

| | | | |
|---|---|---|---|
| DE | 196 33 948 A1 | | 2/1998 |
| DE | 197 28 064 A1 | | 1/1999 |
| DE | 197 56 034 A1 | | 7/1999 |
| DE | 199 16 924 A1 | | 10/2000 |
| DE | 101 44 896 A1 | | 5/2002 |
| DE | 101 44 901 A1 | | 5/2002 |
| DE | 697 13 004 T2 | | 11/2002 |
| DE | 10315643 B3 | * | 10/2004 |
| JP | 09 170652 | | 6/1997 |
| JP | 10 016595 | | 1/1998 |

* cited by examiner

*Primary Examiner*—Thomas R Hannon
*Assistant Examiner*—Justin Krause
(74) *Attorney, Agent, or Firm*—McGlew and Tuttle, P.C.

(57) ABSTRACT

A shifting device for the powerless transmission of shift commands to an automatic transmission of a motor vehicle, with a housing and with a gearshift lever (1) mounted pivotably in a shift gate, wherein the shifting device has a first and a second shift stop (7, 15; 9, 16) for the gearshift lever (1), each shift stop comprising a housing-side stop (7, 9) and a gearshift lever-side stop (15, 16), with a detection device for these two shift positions (12, 13), and an inoperative position (11), into which the gearshift lever (1) pivots by itself from a deflected shift position (12, 13), driven by a restoring force, is located between these shift positions (12, 13). An actuating device (3, 4) at the gearshift lever (1), disengages gearshift lever-side stop (15) of shift position (12) and the gearshift lever (1) can be deflected to another shift stop (8, 17) beyond the shift position (12).

22 Claims, 2 Drawing Sheets

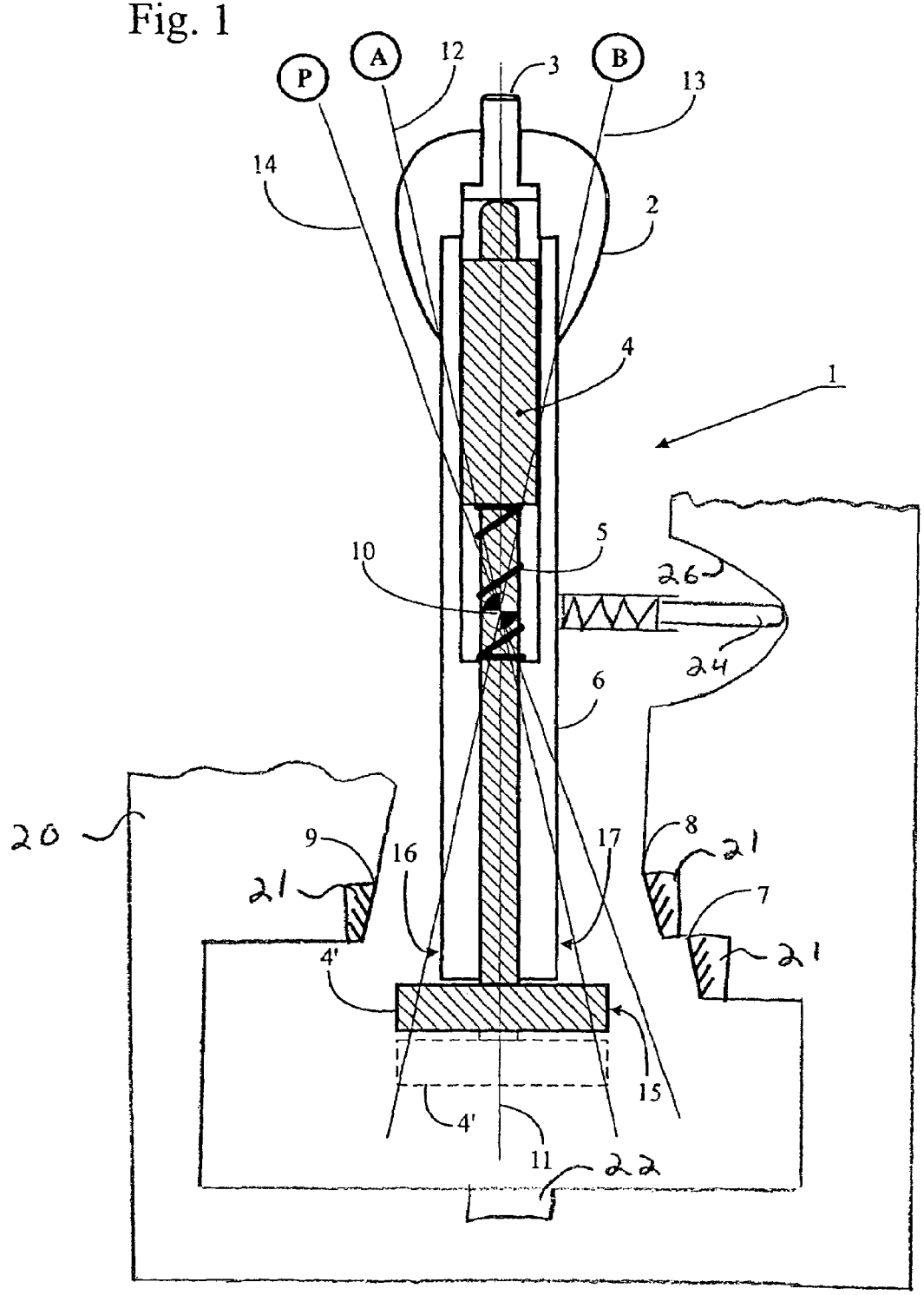

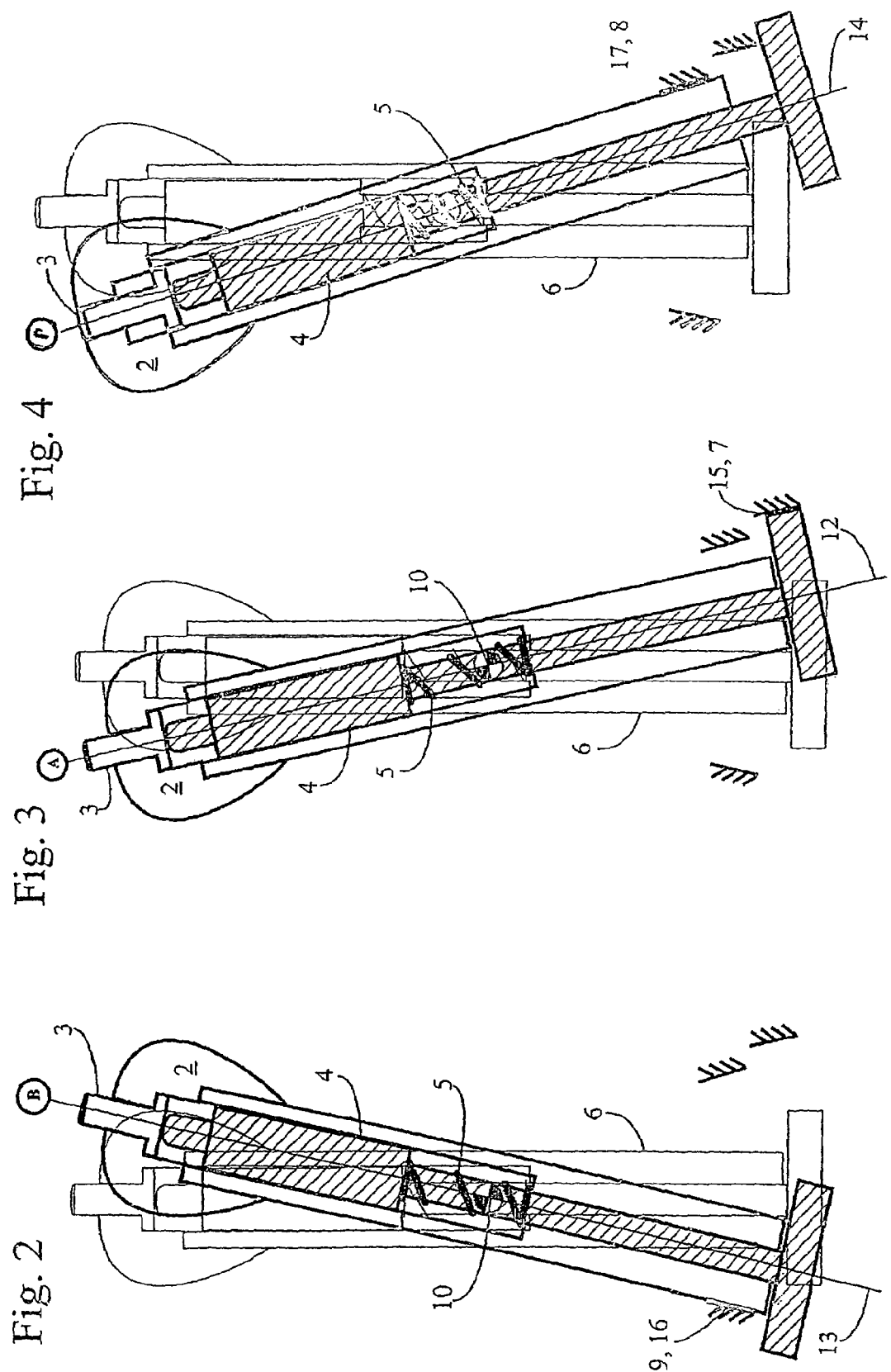

SHIFT-BY-WIRE SHIFTING WITH P POSITION

CROSS REFERENCE TO RELATED APPLICATION

This is a continuation of and claims the benefit (35 U.S.C. §120 and 365(c)) of copending International Application PCT/DE2004/000714 of Apr. 2, 2004, which designated inter alia the United States and which claims the priority of German Application DE 103 15 643.7 of Apr. 4, 2003. The entire contents of each application is hereby incorporated by reference in its entirety.

FIELD OF THE INVENTION

The present invention pertains to a shifting device for the powerless transmission of shifting commands to an automatic transmission of a motor vehicle. The shifting device is mounted in a housing with a gearshift lever mounted pivotably along a shift gate, and with first and second shift stops for the gearshift lever. Each of these stops define a shift position of the gearshift lever and are each formed by a stop on the side of the housing and by a stop on the side of the gearshift lever. Furthermore, the shifting device has a detection device for each stop for these two shift positions, whereas an inoperative position is arranged between these shift positions. The gearshift lever pivots by itself from a deflected shift position into the inoperative position by a restoring force.

BACKGROUND OF THE INVENTION

A similar shifting device is known, for example, from the applicant's patent application No. DE 197 56 034 A1. This document discloses a shifting device with a gearshift lever, which is mounted pivotably about a shift axis and which can be moved forward and backward between two positions in a shift gate and has a detection device each in these shift end positions, and a shift command each is transmitted by the said detection devices to the automatic transmission connected with the shifting device. Consequently, such a shifting device makes possible a so-called sequential shifting, i.e., the gear of the automatic transmission can be upshifted and downshifted by one gear each by tapping the gearshift lever forward and backward.

One drawback of such "tap shifting devices" is that a plurality of shifting operations may possibly be necessary to reach a certain shifting situation and the gear actually selected must also be monitored at least optically in order to reach the particular desired position, preferably the "P" position, during shifting through.

Another similar shifting device is described in the patent application No. DE 199 16 924 A1. This unexamined German application shows a monostable "shift-by-wire shifting," in which different positions of the transmission can be selected by tapping the gearshift lever, and another position can be selected by pushing beyond the first position. It is shown in FIG. 3 of this application that to select the park position, which corresponds to position 2, a pressure point must be bridged over in position 1. This implies the drawback that, for example, position "2" is reached and the "P" position can thus be selected by mistake due to pulling over when selecting the position "R."

SUMMARY OF THE INVENTION

It is a primary object of the present invention to propose a shifting device of the type described in the introduction that reliably prevents the unintentional selection of the "P" position by pulling over the first tap position, and in which it should also be possible to reach a certain shifting position and transmission position without previously having to shift through other positions of the transmission.

This object is accomplished by the present invention by a shifting device with a housing, in which the shifting device is mounted. A gearshift lever is mounted pivotably along a shift gate. First and second shift stops for the gearshift lever each define a shift positions of the said gearshift lever. Each shift stop being formed by a housing-side stop and a gearshift lever-side stop. A detection device is provided for each shift stop for the two shift positions. The gear shift lever has an inoperative position between the said shift positions, into which the gearshift lever pivots by itself from the deflected shift positions by a restoring force. One gearshift lever-side stop is associated with one of the shift positions and is connected with a mechanical actuating device at the gearshift lever. The actuating device can move the one lever-side stop such that the gearshift lever can be deflected beyond the associated shift position to another housing-side stop.

Accordingly, the inventors propose to improve a shifting device, which is known per se, for the powerless transmission of shifting commands to an automatic transmission of a motor vehicle. This prior-art shifting device has a housing, in which the shifting device is mounted, a gearshift lever, which is mounted pivotably along a shift gate, and first and second shift stops for the gearshift lever, which define a shift position of the gearshift lever each, the shift stops being formed by a stop located on the housing side and by a stop on the gearshift lever side. Furthermore, the shifting device has a stop for a detection device for these two shift positions, wherein an inoperative position is arranged between these shift positions, and the gearshift lever pivots by itself into the said inoperative position from a deflected shift position, driven by a restoring force. Provisions are made in the variant according to the present invention of this prior-art shifting device for the gearshift lever-side stop associated with one of the shift positions to be connected with a mechanical actuating device at the gearshift lever, which can move the stop such that the gearshift lever can be deflected to another housing-side stop beyond the said shift position.

A shift gate, in which two shift end positions can be reached by simply tapping the gearshift lever in opposite directions, where the gearshift lever-side stop element can be disengaged for reaching another shift position in order to reach another defined shift position, is now available due to this embodiment.

In a special embodiment, the actuating device, by which the gearshift lever-side stop can be disengaged, may have a push/tie rod, which extends in the gearshift lever and on which a gearshift lever-side stop element arranged at the end with a stop or a laterally arranged pin, which acts as a gearshift lever-side stop element, are optionally provided.

Such an actuating device may have, furthermore, a spring element, which pushes the push/tie rod, when not actuated, into an upper position in relation to the gearshift lever, so that active resetting of the actuating device by the driver does not become necessary. For example, such a spring element may be a coil spring, which surrounds the push/tie rod extending in the gearshift lever and is supported at the gearshift lever, on the one hand, and at the push/tie rod, on the other hand.

In a special embodiment, the actuating device may have, furthermore, a button in a shift knob at the gearshift lever, wherein the said button may be mounted in such a way that it is displaceable in the longitudinal direction, or a longitudinal displacement of the push/tie rod may also be brought about by a laterally arranged button by a corresponding deflection. Such embodiments are known in many different forms in the state of the art. For example, the gearshift lever itself can also be displaced in a spring-loaded manner in its longitudinal direction, so that disengagement of the gearshift lever-side stop is brought about hereby.

For example, a Hall sensor, an optical sensor or even an electric switch may be used as the detection device for the at least one shift position of the gearshift lever. Combinations of the individual sensors and switches are also possible here.

In addition, a detection device or at least one sensor for the detection device may also be provided according to the present invention for the inoperative position of the gearshift lever. As a result, it is also possible to determine without a doubt that the gearshift lever is exactly in this non-deflected position.

A spring-loaded roller, which is arranged at the gearshift lever and runs over a correspondingly designed curvature that is a rigid part of the housing, may be provided to generate the restoring force in a special embodiment, so that the spring load on the roller is reduced towards the inoperative position. Due to the pitch of the curvature in relation to the radius of movement of the gearshift lever, a correspondingly ergonomic embodiment of the compressive and tensile forces can be achieved here during the actuation of the gearshift lever.

Other features and advantages of the present invention will appear from the subclaims and the following description of a preferred exemplary embodiment with reference to the drawings. In the drawings, The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

FIG. 1 is a longitudinal section view of a gearshift lever of the shifting device with stops;

FIG. 2 is a view of the gearshift lever in the tap-B position;

FIG. 3 is a view of the gearshift lever in the tap-A position; and

FIG. 4 is a view of the gearshift lever in the P position.

DESCRIPTION OF THE PREFERRED EMBODIMENT

Referring to the drawings, FIG. 1 shows an embodiment of a shifting device according to the present invention with the gearshift lever 1 and the housing-side stops 7 through 9 represented symbolically, wherein the housing 20 and the mounting of the gearshift lever itself in the housing are not shown in there entirety for the sake of greater clarity.

The gearshift lever 1 comprises essentially a hollow rod 6, which is mounted pivotably about a pivot axis 10. A push rod 4 is located in the hollow rod 6 and is displaceable in the longitudinal direction of the hollow rod 6. The push rod 4 is elastically supported in relation to the hollow rod 6 by means of a coil spring 5. A shift knob 2, which has a push button 3, is attached at the upper end of the push rod 4. The elastically mounted push rod 4 can be displaced in relation to the hollow rod 6 by manual actuation of the push button 3, At its lower end, the push rod 4 has a stop plate 4', which forms a gearshift lever-side stop 15 on the right-hand side. Additional gearshift lever-side stops 16 and 17 are formed by the outer side of the hollow rod 6. The above-mentioned gearshift lever-side stops cooperate with the housing-side stops 7, 8 and 9, respectively.

If the push rod 4 is in the upper position, as shown in FIGS. 1-3, the two stops 7 and 9 on the housing side become active, so that the gearshift lever can be pivoted out forward or backward from the inoperative position 11, shown in FIG. 1, so that the two positions 12 and 13 can be reached.

If the push rod 4 is moved downward by means of the push button 3, so that the stop plate 4' is also moving downward, as is indicated by a broken line in FIG. 1, this causes the lever-side stop 15 to become disengaged, or ineffective, in relation to the corresponding housing-side stop 7. These two stops 15, 7 therefore cannot interact with one another, and the gearshift lever can be moved beyond position 12 into position 14. The housing-side stop 8 cooperates with the gearshift lever-side stop 17 in this position 14, and the gearshift lever reaches its maximum possible deflection in this position.

Detection means 21 which are generally known per se, for example, electric switches, Hall sensors or optical sensors, which are not shown in detail here, are associated with the individual positions 12, 13 and 14. For example, the housing-side stops 7, 8 and 9 may also be designed as insulated electric contacts, so that touching with the gearshift lever 1 induces an electric pulse each, which can be associated with one of the particular shift positions. In addition, an additional sensor 22 may also be provided, with which position 11, i.e., the inoperative position between tap A and tap B, is detected. For example, the actuation of the push button can be released or detected by means of such an additional sensor based on a corresponding logic verification only when the gearshift lever is in this position.

FIGS. 2 through 4 show the gearshift lever from FIG. 1 once again in three different shift positions, the gearshift lever being shown in the neutral position in the background by thin lines.

The gearshift lever 1 is shown in FIG. 2 deflected into position 13 about its pivot axis 10, and the gearshift lever-side stop 16 cooperating with the housing-side stop 9. This may correspond, for example, to the upshifting of the gear by a "tap B" command or to the command for engaging the gear "D."

In FIG. 3, the gearshift lever 1 is deflected in the direction opposite the direction shown in FIG. 2, and the push rod 4 is in a neutral position, so that the housing-side stop 7 cooperates with the gearshift lever-side stop 15. This causes the position 12 of the gearshift lever to be reached and the "tap A" command for downshifting or the command for engaging the gear "R" is transmitted to the automatic transmission.

If the push button 3 is now additionally actuated by the driver, so that the push rod 4 is disengaged downward, the gearshift lever 1 can be moved, as is shown in FIG. 4, beyond position 12 into position 14. The housing-side stop 8 and the gearshift lever-side stop 17 become active in this position, and this position 14 transmits the command for engaging the gear "P," i.e., the parking lock, to the automatic transmission.

The above-mentioned positions tap-A 12 and tap-B 13 can consequently bring about an upshifting and a downshifting, for example, in a sequentially controlled automatic transmission, while they bring about the engagement of the gears "R" and "D" in case of the use of a fully automatically operating transmission. Position 14 corresponds accordingly to the engagement of the park position "P."

Furthermore, a logic verification can be performed in case of the electronic processing of the commands sent by the shifting device, so that the generation of a shift command in the gearshift lever position 14 is also carried out or performed, corresponding to the "P" position of a gearbox, only when this is permitted by the driving situation of the vehicle.

A spring-loaded roller 24, which is arranged at the gearshift lever 1 and runs over a correspondingly designed curvature 26 that is a rigid part of the housing 20, is be provided to generate the restoring force in a special embodiment, so that the spring load on the roller 24 is reduced towards the inoperative position 11. Due to the pitch of the curvature 26 in relation to the radius of movement of the gearshift lever 1, a correspondingly ergonomic embodiment of the compressive and tensile forces can be achieved here during the actuation of the gearshift lever 1.

On the whole, the present invention consequently provides a shifting device for the powerless transmission of shifting commands to an automatic transmission or also an automatic transmission of a motor vehicle that is to be shifted sequentially. The present invention makes it possible to reach certain shift positions or transmission positions, here especially the "P" position, without having to first shift through other positions of the transmission. This is accomplished by a gearshift lever-side stop of one shift position being connected with a mechanical actuating device at the gearshift lever, by the stop being disengaged by the actuation of the actuating device, and by the gearshift lever being able to be deflected beyond the shift position to another shift stop.

It is obvious that the above-mentioned features of the present invention can be used not only in the particular combination described, but in other combinations or alone as well, without going beyond the scope of the present invention. Bringing about a mechanical reversal of the functions of the individual mechanical elements of the present invention is also within the scope of the present invention.

While a specific embodiment of the invention has been shown and described in detail to illustrate the application of the principles of the invention, it will be understood that the invention may be embodied otherwise without departing from such principles.

What is claimed is:

1. A shifting device for the powerless transmission of shift commands to an automatic transmission of a motor vehicle, the device comprising:
   a housing;
   a gearshift lever mounted pivotally in said housing along a shift gate into first and second shift positions, said gearshift lever being driven by a restoring force into an inoperative position between said shift positions;
   first and said second shift stops for said gearshift lever, said shift stops defining said first and second shift positions of said gearshift lever respectively, each shift stop being formed by a housing-side stop and a gearshift lever-side stop;
   a detection device arranged for each said shift stop of said shift positions;
   a mechanical actuating device arranged at said gearshift lever which can move one of said shift stops such that said gearshift lever can be deflected beyond one of said shift positions to a third housing side stop, said housing side stops being fixed to said housing.

2. A shifting device for the powerless transmission of shift commands to an automatic transmission of a motor vehicle, the device comprising:
   a housing;
   a gearshift lever mounted pivotally in said housing along a shift gate into first and second shift positions, said gearshift lever being driven by a restoring force into an inoperative position between said shift positions;
   first and said second shift stops for said gearshift lever, said shift stops each defining said first and second shift positions of said gearshift lever respectively, each shift stop being formed by a housing-side stop and a gearshift lever-side stop;
   a detection device arranged for each said shift stop of said shift positions;
   a mechanical actuating device arranged at said gearshift lever which can move one of said shift stops such that said gearshift lever can be deflected beyond said second shift position to a third housing, said second shift stop having a second gearshift lever-side stop arranged at a lower end of said gearshift lever.

3. A shifting device in accordance with claim 1, wherein: said actuating device has a push/tie rod extending in said gearshift lever.

4. A shifting device in accordance with claim 2, wherein: said push/tie rod extending in said gearshift lever has a second or P-position gearshift lever-side stop element arranged at the end.

5. A shifting device in accordance with claim 4, wherein: said push/tie rod extending in said gearshift lever has a pin as one of said gearshift lever-side stops.

6. A shifting device in accordance with claim 3, wherein: said actuating device has a spring element which biases said push/tie rod, when not actuated, into an upper position in relation to said gearshift lever.

7. A shifting device in accordance with claim 6, wherein: said spring element is a coil spring which surrounds said push/tie rod extending in said gearshift lever and is supported at said gearshift lever and at said push/tie rod.

8. A shifting device in accordance with claim 3, wherein: said actuating device has a button in a shift knob at said gearshift lever.

9. A shifting device in accordance with claim 8, wherein: said button is mounted displaceably in a longitudinal direction of said gearshift lever.

10. A shifting device in accordance with claim 2, wherein: said detection device has one of a Hall sensor, an optical sensor, and an electrical switch for at least one of said shift positions of said gearshift lever.

11. A shifting device in accordance with claim 1, wherein: said second shift stop also has a second housing-side stop, a distance between said inoperative position and said another housing-side stop being less than a distance between said inoperative position and said second housing-side stop.

12. A shifting device in accordance with claim 11, wherein: said housing side stops are fixed to said housing.

13. A shifting device in accordance with claim 2, wherein: said gearshift lever includes a hollow rod;
   a push rod is arranged in said hollow rod and movable in a longitudinal direction of said hollow rod, said push rod having a lower end with a stop plate that forms said second gearshift lever-side stop.

14. A shifting device in accordance with claim 13, wherein: said housing side stops are fixed to said housing.

15. A shifting device in accordance with claim 2, further comprising:
   a sensor for detecting said gearshift lever in said inoperative position.

16. A shifting device in accordance with claim 2, wherein: a spring-loaded roller is arranged at said gearshift lever to generate the restoring force of said gearshift lever, said spring-loaded roller runs over a curvature that is a rigid part of said housing, wherein a spring load on said roller decreases toward said inoperative position.

17. A shifting device comprising:
a housing;
a shift lever pivotally mounted in said housing along a shift gate, said shift gate having first and second ends, and first and second positions at said second end;
first, second and third lever-side stops arranged on said shift lever;
a first housing-side stop arranged on said housing to cooperate with said first lever side stop and limit the pivoting of said shift lever at said first end of said shift gate;
a second housing-side stop arranged on said housing to cooperate with said second lever side stop and limit the pivoting of said shift lever at said first position at said second end of said shift gate;
a third housing-side stop arranged on said housing to cooperate with said third lever side stop and limit the pivoting of said shift lever at said second position at said second end of said shift gate; and
an actuating device arranged on said shift lever, said actuating device selectively moving said second lever side stop into and out of cooperation with said second housing side stop.

18. A shifting device in accordance with claim 17, wherein:
said first and second ends of said shift gate, and said first and second positions are substantially aligned in a row.

19. A shifting device in accordance with claim 18, wherein:
said second position is arranged further from said first end than said first position;
said second lever stop in cooperation with said second housing side stop blocks said shift lever from moving from said first end into said second position.

20. A shifting device in accordance with claim 17, further comprising:
a restoring spring biasing said gearshift lever into an inoperative position between said ends of said shift gate.

21. A shifting device in accordance with claim 17, further comprising:
a sensor arrangement detecting said first and second positions of said shift lever, said sensor arrangement also detecting when said shift lever is at said first end of said shift gate.

22. A shifting device in accordance with claim 17, wherein:
said first and second positions, and said shift lever are arranged to have said shift lever pass through said first position to reach said second position;
said second lever stop in cooperation with said second housing side stop blocks said shift lever from moving from said first end into said second position;
a sensor arrangement detects said first and second positions of said shift lever, said sensor arrangement also detecting when said shift lever is at said first end of said shift gate.

* * * * *